March 30, 1965 M. DE VRIES 3,176,085

TRANSDUCER FOR USE BOTH IN PICK-UPS AND IN TRACK CUTTING MEANS

Filed July 21, 1961 2 Sheets-Sheet 1

INVENTOR.
Machiel de Vries
BY
Fisher, Christen + Goodson

March 30, 1965 M. DE VRIES 3,176,085

TRANSDUCER FOR USE BOTH IN PICK-UPS AND IN TRACK CUTTING MEANS

Filed July 21, 1961 2 Sheets-Sheet 2

INVENTOR.
Machiel de Vries
BY
Fisher, Christen & Goodson

United States Patent Office 3,176,085
Patented Mar. 30, 1965

3,176,085
TRANSDUCER FOR USE BOTH IN PICK-UPS AND IN TRACK CUTTING MEANS

Machiel de Vries, Amsterdam, Netherlands, assignor to Ronette Piezo Electrische Industrie, N.V., Amsterdam, Netherlands, a corporation of the Netherlands Filed July 21, 1961, Ser. No. 125,843
Claims priority, application Netherlands, Aug. 13, 1960, 254,865
5 Claims. (Cl. 179—100.41)

The present invention relates to a transducer for use both in a pick-up and in a track cutting means, said transducer comprising a housing accommodating two electro-acoustic transducing elements and being intended for use in reproducing and in cutting sound recordings, more particularly stereophonic sound recordings, in the faces of a groove provided in a record, which faces enclose an angle with each other, said transducer being provided with a stylus carrying stylus holder which with a vibration transmitting portion bears against the adjoining driven portions of said transducing elements.

Within the scope of this application transducers should be regarded as comprising both pick-ups and track cutting means and though hereinafter reference will always be made to pick-ups for simplicity's sake, this term also covers track cutting means. Transducers are known which are provided with a stylus holder carrying two stylii having points of different radii. Such stylii are then so arranged as to be diametrically opposite or as to enclose an angle. At any rate it is necessary to rotate the stylus holder through a certain angle about its longitudinal axis if it is desired to change over from one stylus to the other. In pick-ups of the type described above in which the stylus holder bears directly against driven portions of the transducing elements, it is not possible to simply turn the stylus holder about its longitudinal axis, because of the frictional forces which occur during such rotation between the stylus holder and the driven portions of the elements.

The object of the invention is to provide a pick-up of the type described above which is so arranged that if the stylus holder is brought from the one operative position into the other operative position said frictional forces do not occur.

To achieve this end, the pick-up according to the invention is characterized by said stylus holder carrying a second stylus and by an eccentric member secured to said stylus holder, which member so co-operates with a thrust face that is stationary relative to the housing that when the stylus holder and the eccentric member are simultaneously rotated about their axes the vibration transmitting portion of the stylus holder describes a path which is closed in itself and which is of such a shape that said vibration transmitting portion of the stylus holder is always clear of the driven portions of the transducing elements as long as neither of the stylii is in its operative position.

For elucidating the invention some embodiments of the transducer according to the invention will be described with reference to the accompanying drawings. In said drawings:

FIGURE 1 schematically shows a side view of a portion of a pick-up according to a first embodiment of the invention;

Figure 1:
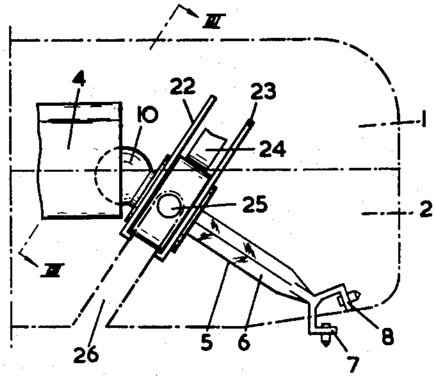

FIGURE 1 schematically shows a portion of the housing of the pick-up comprising an upper portion 1 and a lower portion 2. In said housing two piezo-electric transducing elements 3 and 4 are secured by clamping, which, however, is not visible in the drawing. The drawing shows the free unsupported ends of the transducing elements 3 and 4. A stylus holder generally designated by the numeral 5 comprises a shank 6 carrying two stylii 7 and 8 as well as a bearing cap, generally designated by the numeral 9. The bearing cap is made from a visco-elastic material and comprises a knob-shaped portion 10, two collars 11 and 12 and a neck portion 13 located between said collars. The bearing cap 9 is internally provided with a longitudinal bore, formed complementary in respect of shank 6, so that said shank cannot rotate in the cap 9.

Figure 2:
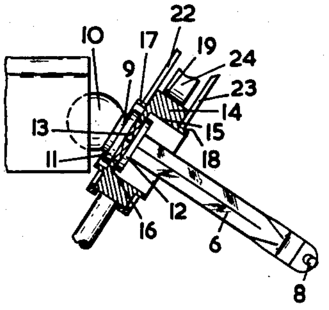
FIGURE 2 is a vertical sectional view according to a longitudinal plane of the pick-up, more particularly the manner in which the stylus holder is supported being shown in section.

In the operative position of each of the stylii 7 and 8 the knob-shaped portion 10 bears against the two transducing elements 3 and 4 and in consequence it can transmit vibrations originating from one of the stylii to the transducing elements. The stylus holder 5 is carried by a drum 14, a sectional view of which is shown in FIGURE 2. Said drum has an axial bore 15 which is locally provided with an inwardly projecting rim 16, located between the two collars 11 and 12.

Figure 3:
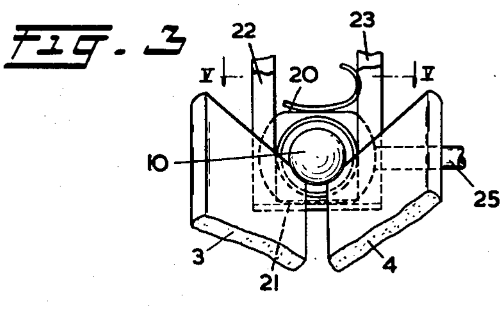
FIGURE 3 is a view according to line III—III in FIGURE 1.

In as much as the collar 13 has a non-circular cross-section and as rim 16 is formed complementary in respect of neck 13 these portions cannot rotate relative to each other either. It is, however, possible for the stylus holder 5 to perform seesawing movements in all possible transverse directions relative to rim 16. Drum 17 has a cylindrically projecting portion 17 and 18, adjacent each of its two main faces. The other portion of drum 14 has a substantially cylindrical outer face 19 which, however, is flattened in two places. These flat faces of said drum are shown in FIGURE 3 and are designated by the numerals 20 and 21.

Figure 4:
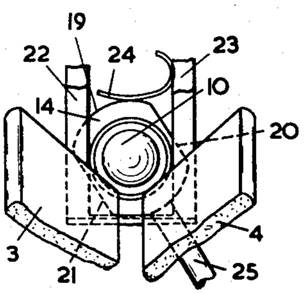
FIGURE 4 is a view similar to the one shown in FIGURE 3, however, in a position in which the stylus holder is being transferred from the one operative position to the other operative position.
Figure 5:
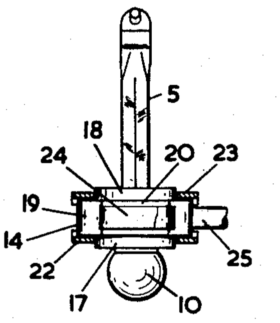
FIGURE 5 is a section on line V—V in FIGURE 3.

The drum 14 is supported and guided by two U-shaped frames 22 and 23 located parallel to each other and spaced from each other. The cylindrical portions 17 and 18, fit between the two legs belonging to one frame and are adapted to rotate between said legs as well as to slide up and down therebetween. The substantially cylindrical portion 19, on the other hand, is enclosed between the two frames. By a leaf spring 24 secured in the housing the drum 14 is constantly urged downwardly against the central portion of the U-shaped frames 22 and 23. The frames 22 and 23 are everywhere spaced from each other—apart from their connection to the upper side of the housing—so as to allow an operating rod 25 secured to the drum 14, to pass between them. Said operating rod 25 extends through a slot 26 in the housing and at its end projecting from the housing it is provided with an operating knob (not shown). If one of the flattened faces 20 or 21 bears on the central portion of the U-shaped frames 22 and 23, as shown in FIGURE 3, the knob-shaped portion 10 bears on the transducing elements 3 and 4. In said position one of these stylii is in its operative position. If the drum 14 is turned from such an operative position the cylindrical portion 19 will start cooperating, as shown in FIGURE 4, with the central portion of the U-shaped frames 22 and 23, so that the stylus holder moves upwardly and the knob-shaped portion 10 will clear the transducing elements 3 and 4. Accordingly the rotation of the stylus holder 5 about its longitudinal axis may take place without this presenting any objections.

Figure 6:
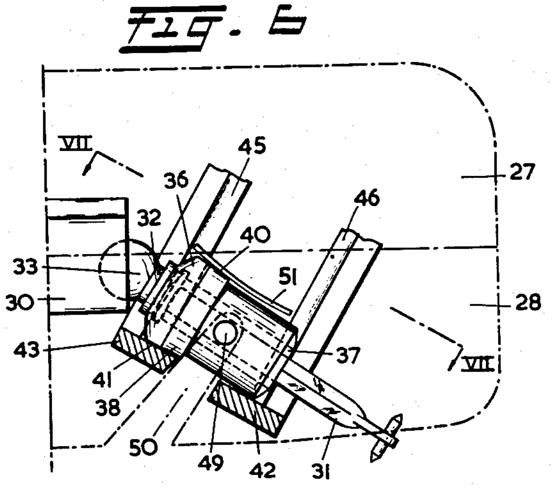
FIGURE 6 is a schematic figure similar to the one shown in FIGURE 1, however, of a second embodiment according to the invention.
Figure 7:
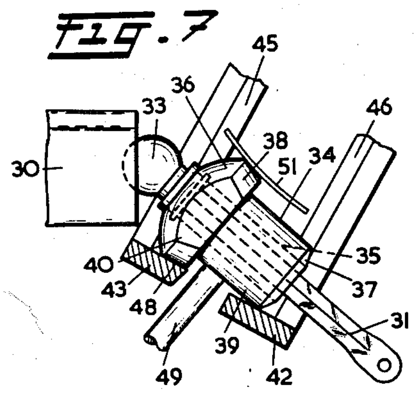
FIGURE 7 is a section on line VII—VII in FIGURE 6.
Figure 8:
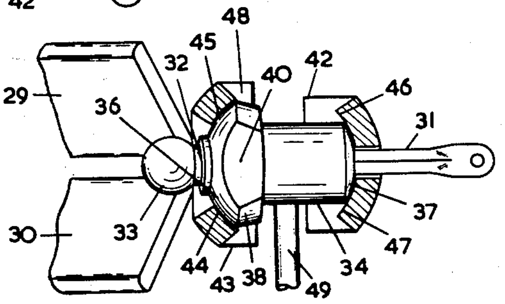
FIGURE 8 shows a portion of FIGURE 6, but relates to a position of the stylus holder during the change-over from the one operative position to the other operative position.

In FIGURES 6–8 another embodiment is shown which in principle differs from the first embodiment in that the stylus holder upon rotation about its longitudinal axis is not at the same time moved parallel to itself, but undergoes a tilting which likewise has for its effect that the knob-shaped portion of the stylus holder is moved clear of the transducing elements. The casing comprises two parts 27 and 28. The two transducing elements are designated by the numerals 29 and 30. The stylus holder comprises a shank 31 and a bearing cap 32, the knob-shaped portion of which is designated by the numeral 33. The drum in which the bearing cap is secured in the same manner as is the case in the first embodiment, has been generally designated by the numeral 34. Drum 34 has a longitudinal bore 35 through which the shank 31 passes with a certain amount of play. The outer surface of drum 34 comprises various parts, to wit a part 36 which is in the form of the segment of a sphere, a part 37 likewise in the form of a segment of a phere, a part 38 in the form of a cone and a part 39 of a cylindrical shape. The conical part 38 furthermore is flattened in two places, to wit at 40 and at 41.

Just as in the first embodiment the drum is again supported and guided by two U-frames generally designated by the numerals 42 and 43. The legs of said frames are cylindrical on the inside at 44, 45, 46, and 47, so that the spherical faces 36 and 37 bearing against said parts may rotate and also may move up and down between the legs of frames 42 and 43. If drum 34 bears on one of the faces 40 or 41, the knob-shaped portion 33 bears against the transducing elements 29 and 30. If, however, the conical portion 38 comes into contact with the bottom portion 48 of frame 43, the knob-shaped portion 33 is lifted so that the stylus holder can be freely rotated about its logitudinal axis.

In order to enable the sleeve 34 to be rotated an operating rod is provided, designated by the numeral 49, which rod extends from the housing through a slot 50 and is provided with an operating knob at its end outside said housing. A leaf spring 51 secured in the housing is constantly in contact with the drum 34 as far as possible.

I claim:

1. In a binaural transducer means for use in reproducing or recording sound, including a housing means, two electro-acoustic transducing elements each having a mounting portion and a driven portion, said mounting portions being attached to the housing means to position the driven portions closely adjacent each other, and elongated stylus holder having two stylii at one end projecting laterally in angular relationship to each other and having a driving portion remote from said stylii for simultaneous operative engagement with the driven portions of both said transducer elements, rotary support means for the stylus holder attached to the housing means to position the driving portion of the stylus holder in said operative engagement, said rotary support means including means to rotate the stylus holder about its principal axis to selectively position said stylii in operative relationship with a recording surface and concurrently to position said driving portion out of engagement with said driven portions of the transducing elements during said rotation between said operative positions.

2. The invention as defined in claim 1, wherein said rotary support means includes a pair of elements, one of said elements being fixed to the housing means, the other being attached to the stylus holder, one of said elements having a cam surface in engagement with the other element to shift the driving portion of the stylus holder laterally out of engagement with the driven portions of the transducing elements during said rotation between operative positions.

3. The invention as defined in claim 1, wherein said rotary support means includes a pair of spaced parallel members attached to said housing means joined by a transverse member, said stylus holder having a radially extending generally circular element, said circular element being provided with a pair of flat peripheral surfaces for engagement with said transverse member when the angular position of the stylus holder corresponds with the operative positions of the respective stylii, the radius of portions of the circular element between said flat portions being sufficient to shift the driving portion of the stylus holder laterally out of engagement with the driven portions of the transducing elements during rotation between said operative positions.

4. The invention as defined in claim 1, wherein the driven portions of the transducing elements comprise a pair of converging flat surfaces, said driving portion of the stylus holder comprising a generally spherical enlargement positioned at one end thereof, and said rotary support means includes camming means to move said spherical enlargement away from said converging surfaces during rotation of the stylus holder and also including biasing means to urge the spherical enlargement into engagement with said surfaces.

5. The invention as defined in claim 4, wherein said rotary support means includes a pair of inwardly directed spaced parallel channel members joined by a transverse member having a flat surface, said camming means includes a radially extending generally circular element secured to the stylus holder and slidably received within said channel members, said circular element having a pair of flat peripheral surfaces for engagement with the surface of the transverse member, and said biasing means includes spring means slidably engageable with said circular member.

References Cited in the file of this patent

UNITED STATES PATENTS 2,955,216 Dieter ---------------- Oct. 4, 1960